United States Patent
Sasaki et al.

(10) Patent No.: US 6,783,738 B1
(45) Date of Patent: Aug. 31, 2004

(54) GAS SEPARATOR (75) Inventors: Takashi Sasaki, Yokohama (JP);
Shoichi Hisa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/417,918

(22) Filed: Oct. 13, 1999

(30) Foreign Application Priority Data

Oct. 15, 1998 (JP) ........................................... 10-293792

(51) Int. Cl.[7] ............................ B01D 53/34; F01N 3/10
(52) U.S. Cl. ...................... 422/173; 422/171; 422/177; 422/198; 422/211; 96/125; 96/126; 96/146
(58) Field of Search .................................. 422/198, 211, 422/168–171, 177–178, 180, 173; 96/121–122, 125–126, 130, 143, 146; 55/400

(56) References Cited

U.S. PATENT DOCUMENTS

| | | | | |
|---|---|---|---|---|
| 2,286,920 A | * | 6/1942 | Miller | 96/125 |
| 2,639,000 A | * | 5/1953 | Edwards | 96/125 |
| 3,446,031 A | * | 5/1969 | Chang et al. | 62/271 |
| 3,865,924 A | * | 2/1975 | Gidaspow et al. | 423/230 |
| 4,012,206 A | * | 3/1977 | Macriss et al. | 95/113 |
| 4,391,616 A | * | 7/1983 | Imamura | 95/92 |
| 4,701,189 A | * | 10/1987 | Oliker | 95/113 |
| 5,017,202 A | * | 5/1991 | Ogata et al. | 96/125 |
| 5,057,128 A | * | 10/1991 | Panzica et al. | 55/400 |
| 5,133,784 A | * | 7/1992 | Boudet et al. | 95/100 |
| 5,169,414 A | | 12/1992 | Panzica et al. | 55/60 |
| 5,464,468 A | * | 11/1995 | Tanaka et al. | 96/125 |
| 5,693,123 A | | 12/1997 | Klobucar | 96/125 |
| 5,866,090 A | | 2/1999 | Nakagawa et al. | 423/230 |

FOREIGN PATENT DOCUMENTS

| | | | | |
|---|---|---|---|---|
| DE | 196 45 823 | | 5/1998 | |
| EP | 0 627 252 | | 12/1994 | |
| FR | 2 720 294 | | 12/1995 | |
| JP | 9-99214 | | 4/1997 | |
| JP | 09099214 | * | 4/1997 | B01D/53/62 |

* cited by examiner

Primary Examiner—Hien Tran
Assistant Examiner—Jennifer A. Leung
(74) Attorney, Agent, or Firm—Foley & Lardner LLP (57) ABSTRACT

A circular rotating body having a plurality of fan-shaped blocks is disposed inside a casing and driven to rotate. A gas absorption/releasing material in the blocks absorbs/releases a specific gas component from a gas mixture depending on temperature. The rotating body has a hollow static central portion which is divided to form two temperature adjusting fluid paths through which temperature adjusting fluids having different temperatures pass. First and second independent gas flow paths are defined by the casing. A gas mixture containing the gaseous component flows along the first gas flow path through blocks which are heated to a first temperature at which absorption takes place. The blocks are then rotated to a position wherein they are heated to a higher second temperature and release the gaseous component which is exhausted via the second gas flow path. Blocks sequentially enter positions which separate the two different zones.

6 Claims, 5 Drawing Sheets

GAS SEPARATOR

BACKGROUND OF THE INVENTION

The present invention relates to a gas separator for separating carbon dioxide from a mixed gas containing carbon dioxide in an electric power (energy) plant or chemical plant.

Generally, fossil fuel such as natural gas, petroleum gas and coal gas containing carbon dioxide is used in a gas turbine plant and electric power plant. Such fossil fuel is ordinarily composed of carbon monoxide, carbon or other hydrogen carbide.

Therefore, combustion gas after the fuel is burnt under the air includes carbon dioxide, nitrogen oxide, sulfur oxide as well as nitrogen gas and oxygen gas. Emission of harmful gas such as carbon dioxide, nitrogen oxide, and sulfur oxide into the air provides a globally important social problem in viewpoints of warm-up of the earth and environmental pollution.

Although a method of processing nitrogen oxide, sulfur oxide and the like has reached a stage capable of suppressing their values within restriction values on the law with a progress of technology, a processing method for carbon dioxide has not yet found any effective solution because an amount of the carbon dioxide handled in industries is too huge.

Recently, as means for processing carbon dioxide from emission gas discharged into the air after combustion, a solvent for absorbing the carbon dioxide selectively from the emission gas has been proposed by utilizing the nature of the characteristic of releasing the carbon dioxide easily when the absorbed carbon dioxide is heated.

The means for processing carbon dioxide using the solvent mentioned above has the following problems. That is, first, although the carbon dioxide is absorbed when it is left in contact with the solvent, because the contact time cannot be set to infinite, it is difficult to always keep the emission gas and solvent in contact with each other during the operation (running) of the generation plant. Therefore, components of carbon dioxide are left not recovered in the emission gas and then may be discharged into the air.

Secondly, because a large amount of the carbon dioxide is produced in a generation plant, the amount of the solvent necessary for recovering the carbon dioxide also becomes large, so that an enormous amount of heat energy is needed for heating the solvent.

Thus, in the conventional method, the carbon dioxide recovery system itself requires a high cost and further, much cost for operating the system is required.

On the other hand, if looking from other aspect, there have been proposed systems or means using a reproducible energy such as solar energy for generating hydrogen as a fuel and for separating carbon dioxide by applying a steam to the carbon dioxide in a closed loop and condensing steam during the circulation of the mixed gas. However, the structures of these systems or means are complicated and are still on experimental level, so that practical realization thereof needs more time and research.

SUMMARY OF THE INVENTION

An object of the present invention is to eliminate defects or drawbacks encountered in the prior art mentioned above and to provide a gas separator for separating a particular gas by effectively using a gas absorption/releasing material having a characteristic feature which absorbs the particular gas from a mixed gas when a predetermined temperature is reached and then releasing the particular gas when another predetermined temperature is reached.

This and other objects can be achieved according to the present invention by providing, in one aspect, a gas separator for separating a specific gas from a mixed gas, comprising:

an outer casing;
a rotating body disposed inside the casing; and
a drive means mounted to the casing and adapted to drive the rotating body to be rotatable,
the rotating body being formed with first and second flow paths formed independently from each other, the first flow path being provided with a gas absorption/releasing material for absorbing and releasing a specific gas from a mixed gas depending on different temperature zones, wherein fluids of different temperatures depending on a rotating position of the rotating body are fed through the second flow path, a heat is transmitted between the first and the second flow paths, and the specific gas is absorbed and released by changing the temperature of the gas absorption/releasing material in accordance with the rotating position of the rotating body.

In a preferred embodiment of this aspect, the rotating body is composed of a plurality of fan-shaped hollow blocks arranged in a circumferential direction thereof and the gas absorption/releasing material for absorbing and releasing the specific gas from the mixed gas depending on different temperature zones is provided on an inner surface of each of the blocks. The rotating body is provided with a hollow static portion at a rotational (axial) central portion thereof. The static portion is divided into two sections in the circumferential direction thereof so as to form introduction paths for introducing fluids of different temperatures and a plurality of supply paths are formed among a plurality of the blocks by disposing sealing or blocking portions between the static portion and the rotating body and between the rotating body and the casing so as to divide the supply paths into two sections, and the supply paths divided into two sections are communicated with the introduction paths divided into two sections so as to form the second flow path.

The rotating body takes a plurality of rotating positions, the mixed gas is fed to the gas absorption/releasing releasing material at a first rotating position of the rotating body while the specific gas is released from the gas absorption/releasing material at a second rotation position of the rotating body, and blocking or closing portions for blocking communication between the first rotating position and the second rotating position are provided in the casing. The blocks are divided into ones related to an absorption reaction of the specific gas and other ones related to a releasing reaction of the specific gas and the second flow path is divided by the blocking. portions so that the number of blocks related to one of the absorption reaction and the releasing reaction which takes a time longer than another one thereof is larger than the number of blocks related to another one thereof. Either one of a honey-comb member and a fin member is provided in the first and second flow paths.

The casing is provided with a supply port for supplying the mixed gas including the specific gas to the first flow path in the rotating body and a discharge port for releasing the mixed gas after the specific gas is absorbed. The casing may be further provided with a recovery port for recovering the released mixed gas including the specific gas in a high concentration.

In another aspect of the present invention, there is provided a gas separator for separating a specific gas from a mixed gas, comprising:

an outer casing;

a rotating body disposed inside the casing; and a drive means mounted to the casing and adapted to drive the rotating body to be rotatable, the rotating body being formed with first and second flow paths are independently from each other, the first flow path being provided with a gas absorption/releasing material for absorbing and releasing a specific gas from a mixed gas depending on different temperature zones, wherein the rotating body takes a plurality of rotating positions including first and second rotating positions, the mixed gas set to a temperature zone necessary for performing an absorption reaction of the specific gas is fed at the first rotating position of the rotating body while a fluid of a temperature necessary for performing a release reaction of the specific gas is fed at the second rotating position of the rotating body, a heat is transmitted between the first and second flow paths and the specific gas is absorbed and released by changing the temperature of the gas absorption/releasing material in accordance with the rotating positions of the rotating body.

In a preferred embodiment of this aspect, the rotating body is composed of a plurality of fan-shaped hollow blocks arranged in the circumferential direction thereof and the rotating body has a central portion formed as a hollow static portion, from which a fluid of a temperature necessary for performing a release reaction of the specific gas is introduced, and supply paths are formed between the blocks so as to be communicated with the static portion thereby to form the second flow path.

In a further aspect of the present invention, there is provided a gas separator for separating a specific gas from a mixed gas comprising:

an outer casing;

a rotating body disposed inside the casing; and a drive means mounted to the casing and adapted to drive the rotating body to be rotatable, the rotating body being provided with a gas absorption/releasing material for absorbing and releasing a specific gas depending on different temperature zones, wherein a flow path for feeding a fluid for changing the temperature of the gas absorption/releasing material depending on a rotating position of the rotating body is provided so as to absorb and release a specific gas based on a rotating position of the rotating body.

In a more detailed aspect, there is provided a gas separator for separating a specific gas from a mixed gas, comprising:

an outer casing;

a rotating body disposed inside the casing, said rotating body being composed of a plurality of fan-shaped blocks arranged in a circumferential direction thereof;

a drive means mounted to the casing and adapted to drive the rotating body to be rotatable in a predetermined direction;

a gas absorption/releasing material provided to the blocks and adapted to absorb and release a specific gas from a mixed gas depending on different temperature zones; and a hollow static portion disposed at a central portion of the rotating body and having an inner hollow portion which is divided by a separation plate thereby to form two introducing paths through which temperature adjusting fluids having different temperatures pass, the rotating body being formed with first and second flow paths formed independently from each other, the first flow path being provided with the gas absorption/releasing material, and wherein fluids of different temperatures depending on a rotating position of the rotating body are fed through the second flow path so that a heat is transmitted between the first and the second flow paths.

In a further aspect, there is provided a gas sepaarator for separating a specific gas from a mixed gas comprising:

an outer casing;

a rotating body disposed inside the casing;

a drive means mounted to the casing and adapted to drive the rotating body to be rotatable in a predetermined direction;

a gas absorption/releasing means provided on an inner surface of said rotating body and adapted to absorb and release a specific gas depending on different temperature zones; and a flow path means formed inside the rotating body for feeding a fluid thereinto, the flow path means being divided into a plurality of flow path sections by blocking portions so as to absorb and release the specific gas depending on a rotating position of the rotating body in accordance with a temperature of the fluid flowing the respective flow path sections.

In the above various aspect, the mixed gas is a gas containing a carbon dioxide while the specific gas is a carbon dioxide and the gas absorption/releasing material reacts with the carbon dioxide so as to generate a lithium carbonate, in the preferred embodiment, thereby to absorb the carbon dioxide and releases the carbon dioxide by decomposing the lithium carbonate. A temperature necessary for performing the absorption reaction of the carbon dioxide is approximately 500° C. while a temperature necessary for performing the release reaction of the carbon dioxide is over approximately 700° C.

According to the characteritic structures and features of the present invention mentioned above, fluids of different temperatures are fed depending on a rotating position of the rotor and by changing a temperature of the gas absorption/releasing material having a characteristic which absorbs the specific gas when a predetermined temperature is reached and releases that particular gas when another predetermined temperature is reached, absorption and release of that specific gas are carried out, so that the specific gas can be separated effectively.

In another aspect, because the temperature of the mixed gas is adjusted to a temperature zone in which the gas absorption/releasing material absorbs the specific gas preliminarily, as compared to the first aspect, the necessity of introducing the temperature adjusting fluid is eliminated, thereby making it possible to simplify the structure.

According to a further aspect, because a flow path for feeding fluid for changing the temperature of the gas absorption/releasing material depending on rotating position of the rotating body is provided so as to carry out the absorption/releasing of the specific gas based on the rotating position of the rotor, the structure thereof can be further simplified.

DESCRIPTION OF THE PREFERRED EMBODIMENTS

Hereinafter, the embodiments of the present invention will be described with reference to the accompanying drawings.

First Embodiment

A first embodiment will be described hereunder with reference to FIGS. 1 to 6, and in this embodiment, a gas separator is an apparatus for separating carbon dioxide from gas exhausted from a gas turbine plant.

Figure 1:
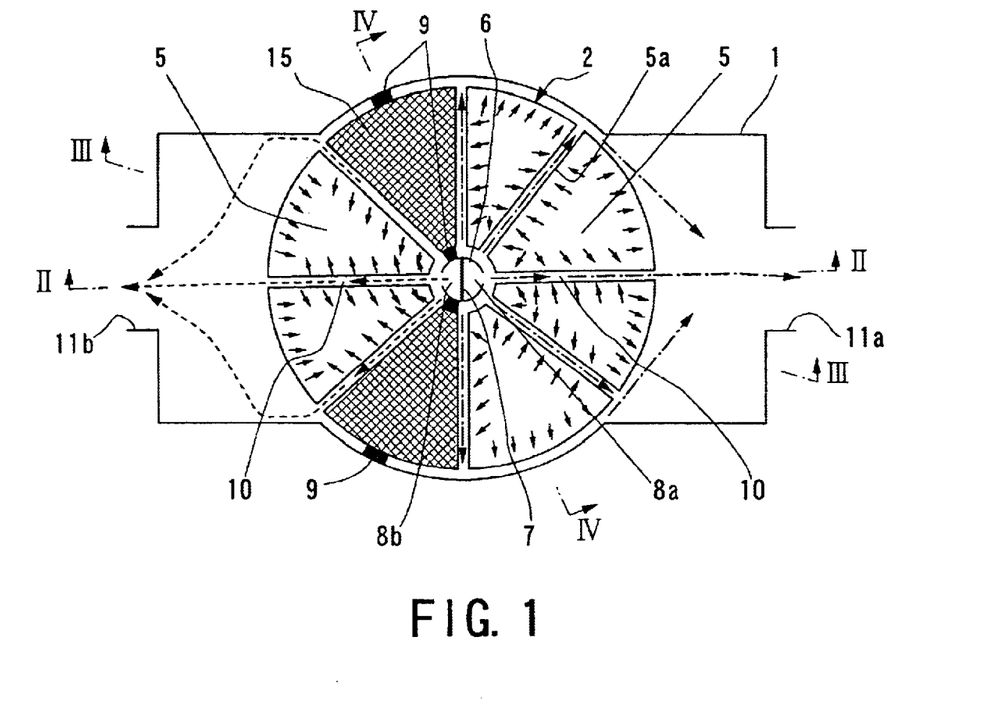
FIG. 1 is a schematic cross sectional view showing a first embodiment of a gas separator according to the present invention.
Figure 2:
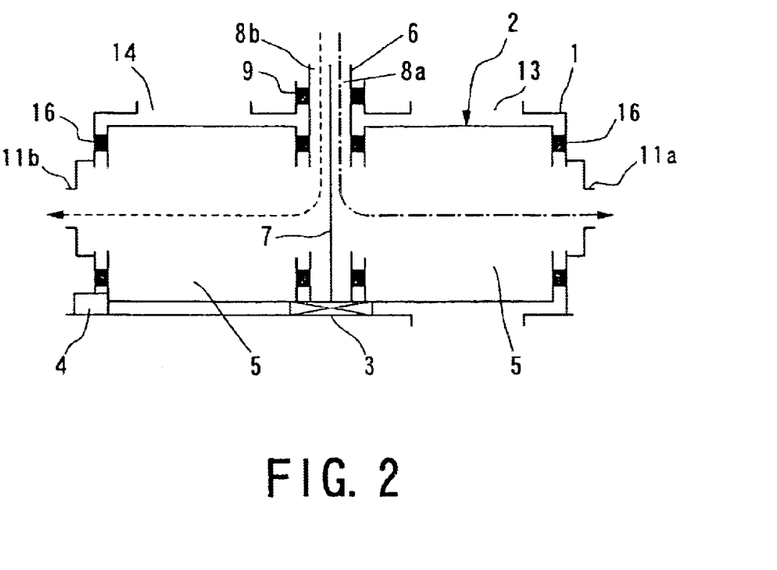
FIG. 2 is a schematic sectional view taken along the line II—II of FIG. 1.

As shown in FIGS. 1 and 2, a rotor (rotating body) 2 is provided in a casing 1 formed in a substantially box shape and the rotor 2 is supported by a supporting unit 3 disposed in a center of a bottom portion of the casing 1 and rotated at a constant speed by driving a rotation driving unit 4 such as a motor disposed at the bottom of the casing 1.

Figure 5:
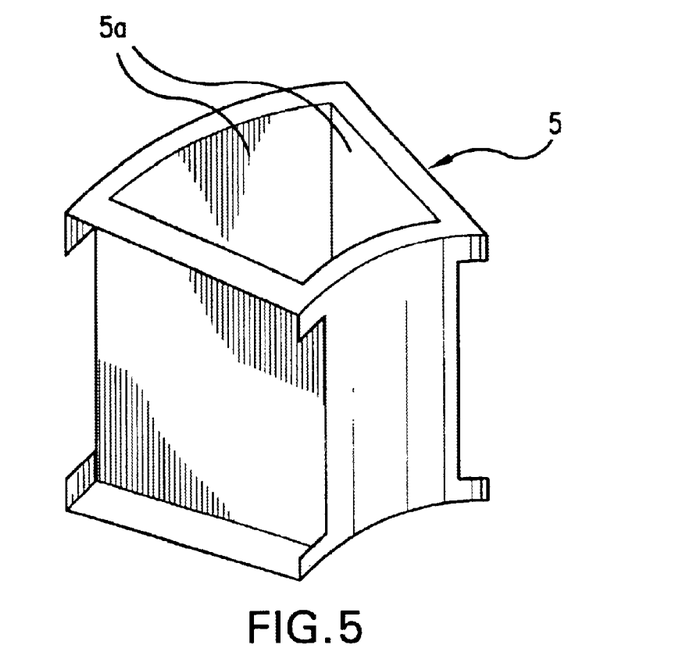
FIG. 5 is a perspective view showing a block of a rotor of FIG. 1.
Figure 6:
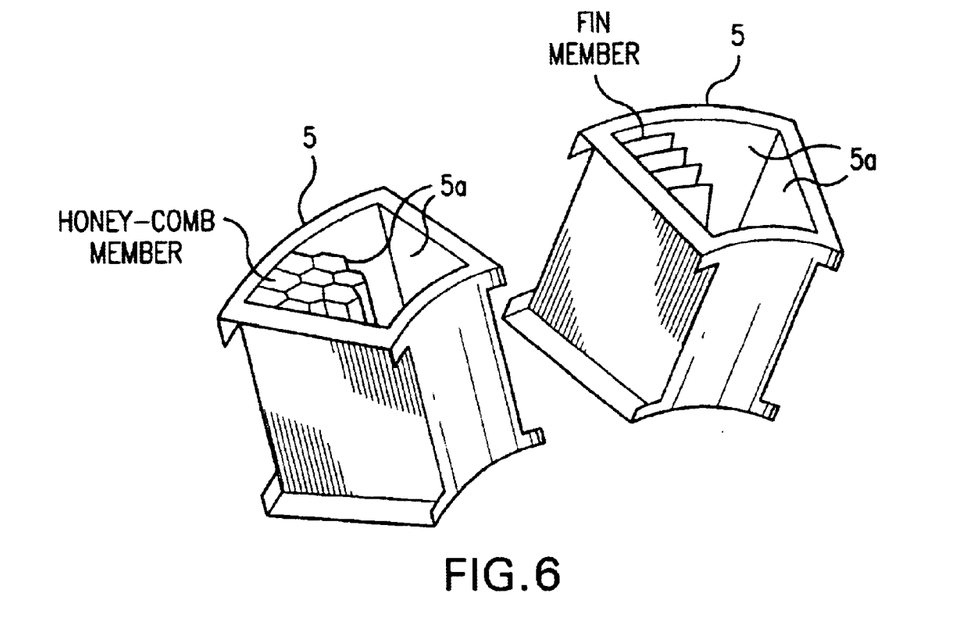
FIG. 6 is a perspective view showing a condition in which two blocks of FIG. 5 are combined.

The rotor 2 is formed by disposing a plurality (eight in this embodiment) of hollow blocks 5 each having a fan shape in plan view in a circumferential direction as shown in FIGS. 5 and 6, and a carbon dioxide absorption/releasing material 5a is applied (bonded) to an inner surface of each of these blocks 5, as a gas absorption/releasing material for absorbing a specific gas (carbon dioxide) from a mixed gas containing carbon dioxide and releasing the carbon dioxide, the absorption and release being carried out in different temperature ranges. Mixed gas containing emission gas and carbon dioxide is supplied to each block 5 and a first flow path is formed for carrying out absorption and release of the specific gas from the mixed gas.

The carbon dioxide absorption/releasing material 5a reacts with the carbon dioxide at a pressure of 1 ata and at a temperature of about 500° C. to generate lithium carbonate thereby absorbing the carbon dioxide and decomposes the lithium carbonate at a pressure of 1 ata and at a temperature of about 700° C. to release the carbon dioxide. Because the pressure zone and temperature zone suitable for absorption and release depend on concentration of the carbon dioxide, it is necessary to select their optimum values corresponding to the case, and a chemical formula therefor is described below.

A hollow static portion 6 supported by the supporting unit 3 is disposed in the axial center of rotation of the rotor 2, and in this static portion 6, a separating or partitioning plate 7 is fixed along the center in an axial direction so as to divide the hollow static portion 6 into two parts in the circumferential direction as shown in FIG. 2 and two introduction paths 8a, 8b are formed by this separating plate 7. Temperature adjusting fluids having different temperatures are introduced to the introduction paths 8a, 8b, while a temperature adjusting fluid (indicated by dot and dash line) of about 500° C. is introduced into the introduction path 8a and a temperature adjusting fluid (indicated by dotted line) of about 700° C. is introduced to the introduction path 8b.

A plurality of sealing or blocking portions 9 are provided between the static portion 6 and rotor 2 and between the rotor 2 and casing 1 as shown in FIG. 2. A plurality of supply paths 10 formed between the plurality of the blocks 5 by the sealing portions 9 are divided into two sections. The supply paths 10 divided into two sections correspond to the introduction paths 8a, 8b divided into two sections so as to be communicated with each other.

Discharge ports 11a, 11b for releasing the temperature adjusting fluid are formed on both side surfaces of the casing 1. A temperature adjusting fluid of about 500° C. introduced via the introduction path 8a passes through the supply path 10 and is discharged via a discharge port 11a, while a temperature adjusting fluid of about 700° C. introduced via the introduction path 8b passes through the supply path 10 and is discharged via the discharge port 11b. Therefore, a second flow path which allows fluids of different temperatures to flow depending on a rotating position of the rotor 2 is constructed by the introduction paths 8a, 8b divided into two sections and the supply path 10. Then, the second flow path formed of the supply path 10 and the first flow path in the respective blocks 5 are so constructed that heat can be transferred to each other.

Figure 3:
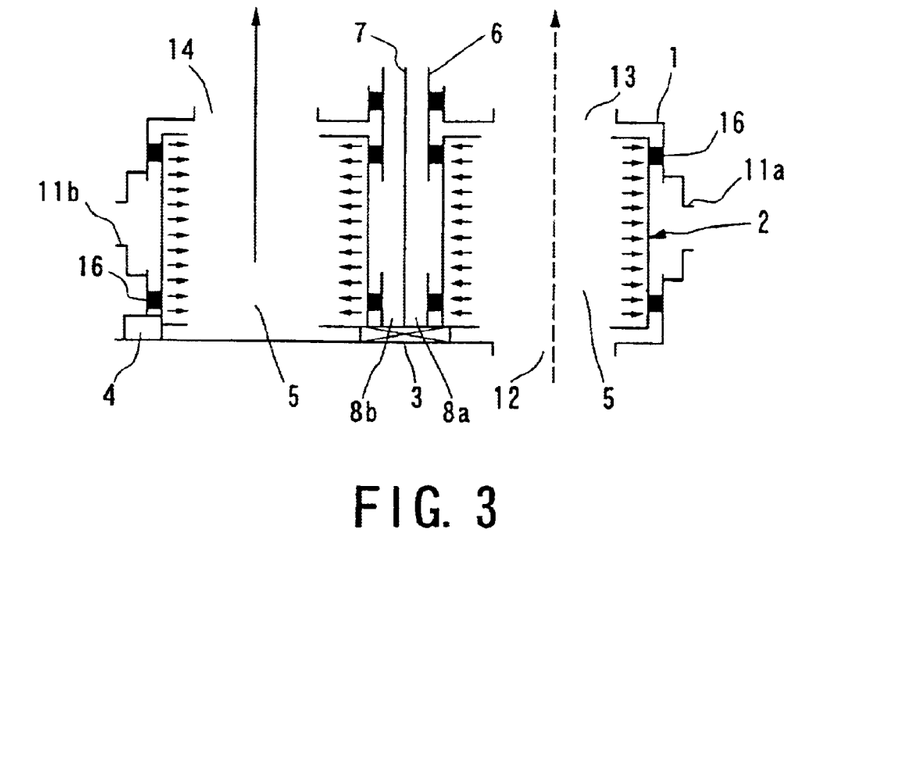
FIG. 3 is a schematic sectional view taken along the line III—III of FIG. 1.

As shown in FIG. 3, a supply port 12 for supplying mixed gas containing the carbon dioxide such as emission gas discharged from a gas turbine plant is formed in a bottom (lower) portion of the casing 1. A discharge port 13 for releasing the mixed gas after the carbon dioxide has been absorbed and a recovery port 14 for recovering the mixed gas containing released the carbon dioxide of high concentration are formed in a top (upper) portion of the casing 1.

The supply ports 12 and discharge ports 13 are formed corresponding to a right half of the rotor 2 of FIG. 1, that is, corresponding to four blocks 5. On the other hand, the recovery ports 14 are formed corresponding to two blocks 5. The supply path 10 of the second flow path is divided by the sealing portion 9 so that a number of the plurality of the blocks 5 are related to a reaction taking longer of absorption reaction and release reaction for carbon dioxide, namely, absorption reaction. A width of the sealing portion 9 in the circumferential direction is larger than the supply path 10 so as to realize the sealing at every position of the rotation.

Figure 4:
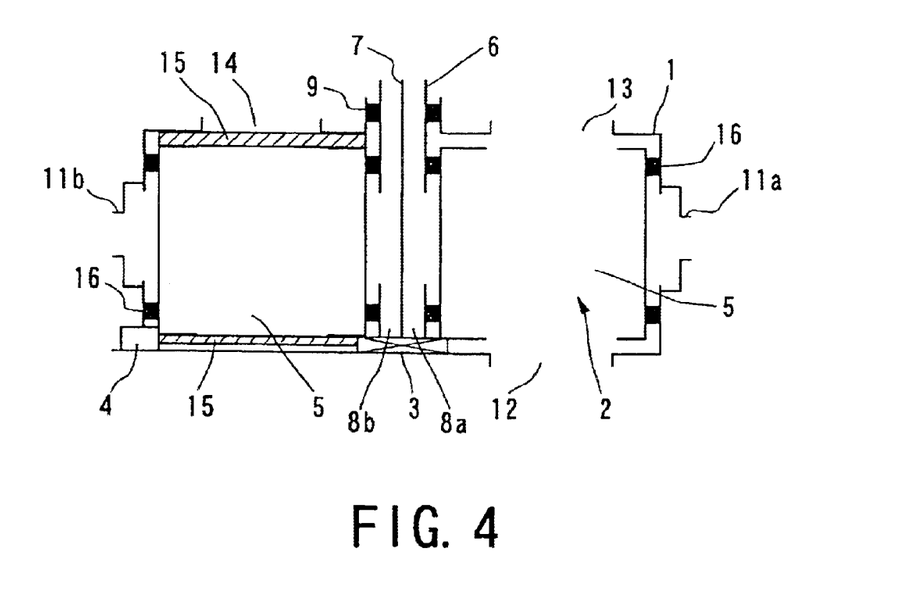
FIG. 4 is a schematic sectional view taken along the line IV—IV of FIG. 1.

Further, two pieces of fan-shaped blocking or closing portions 15 for blocking communication of gas in the block 5 between a first rotating position for allowing the mixed gas to flow over the carbon dioxide absorption/releasing material 5a in the rotor 2 and a second rotating position for releasing a specific gas from the carbon dioxide absorption/releasing material 5a are provided on both the upper and lower portions of each block of the casing 1 as shown in FIGS. 1 and 4. That is, these blocking portions 15 are disposed between the carbon dioxide absorbing position and the carbon dioxide releasing position in the rotation position of the rotor 2.

The rotor 2 acts to perform, in an alternately repeating manner depending on the rotating position, a condition in which the supply path 10 feeds the temperature adjusting fluid of about 500° C. introduced via the introduction path 8a so as to keep inside of the block 5a at about 500° C. and a condition in which it feeds the temperature adjusting fluid of about 700° C. introduced via the introduction path 8b so as to keep the inside of the block 5a at about 700° C.

According to such action, the absorption and release of the carbon dioxide in the block 5 are repeated alternately. Sealing units 16 seal the flow paths and the supply paths in the block 5 as shown in FIGS. 2, 3.

Therefore, according to this embodiment, the rotor 2 containing the flow paths in the independent blocks 5 and supply path 10 is arranged, and the carbon dioxide absorption/releasing material 5a for absorbing and releasing the carbon dioxide from the mixed gas containing carbon dioxide corresponding to different temperature zones is provided in each of the blocks 5. Fluids of different temperatures depending on a rotation position of the rotor 2 are fed through the supply path 10 and heat can be transferred between the block 5 and supply path 10. According to the rotation position of the rotor 2, the temperature of the carbon dioxide absorption/releasing material 5a is changed so as to absorb and release the carbon dioxide.

An operation of this first embodiment will be described hereunder.

By driving the rotation driving unit 4, the rotor 2 is rotated in a single direction at a constant speed so as to feed the mixed gas containing the carbon dioxide into the blocks 5 via the supply port 12 of the casing 1. When a temperature adjusting fluid of about 500° C. flows into the supply path 10 via the introduction path 8a, the heat is transferred to the blocks 5 so that the carbon dioxide absorption/releasing material 5a in the block 5 rises, in its temperature, to about 500° C. and reacts with the carbon dioxide so as to generate a lithium carbonate thereby to absorb the carbon dioxide. Then, the temperature adjusting fluid leaving the supply path 10 is discharged via the discharge port 11a and the mixed gas after the carbon dioxide has been absorbed is released via the discharge port 13.

Subsequently, the rotor 2 is rotated and if the block 5 absorbing the carbon dioxide passes the blocking portion 15 and reaches the recovery port 14 of the casing 1, the temperature adjusting fluid of about 700° C. flows into the supply path 10 from the introduction path 8b. Then, the carbon dioxide absorption/releasing material 5a in the block 5 rises, in its temperature, to about 700° C. so that the lithium carbonate is decomposed thereby releasing the absorbed carbon dioxide. As a result, the concentration of the carbon dioxide in the block 5 becomes high and the mixed gas containing such high concentration carbon dioxide is recovered via the recovery port 14. Then, the temperature adjusting fluid coming out of the supply path 10 is discharged via the discharge port 11b.

According to this embodiment, the carbon dioxide absorption/releasing material 5a for carrying out the absorption and release of the carbon dioxide from the mixed gas containing the carbon dioxide according to the different temperature zones is provided in the block 5, and fluids of different temperatures depending on a rotation position of the rotor 2 is fed through the supply path 10. Heat can be transferred between the block 5 and supply path 10, and by changing the temperature of the carbon dioxide absorption/releasing material 5a according to the rotation position of the rotor 2, the absorption and release of the carbon dioxide is carried out. Therefore, the carbon dioxide can be effectively separated with such a simple structure.

If in this embodiment, either honey-comb or fin is provided in the first flow path in each of the blocks 5 and the second flow path composed of the supply path 10, a heat transmission area and an installation area of the carbon dioxide absorption/releasing material 5a are increased so as to improve the heat transmission performance and the carbon dioxide separation performance.

Second Embodiment

Figure 7:
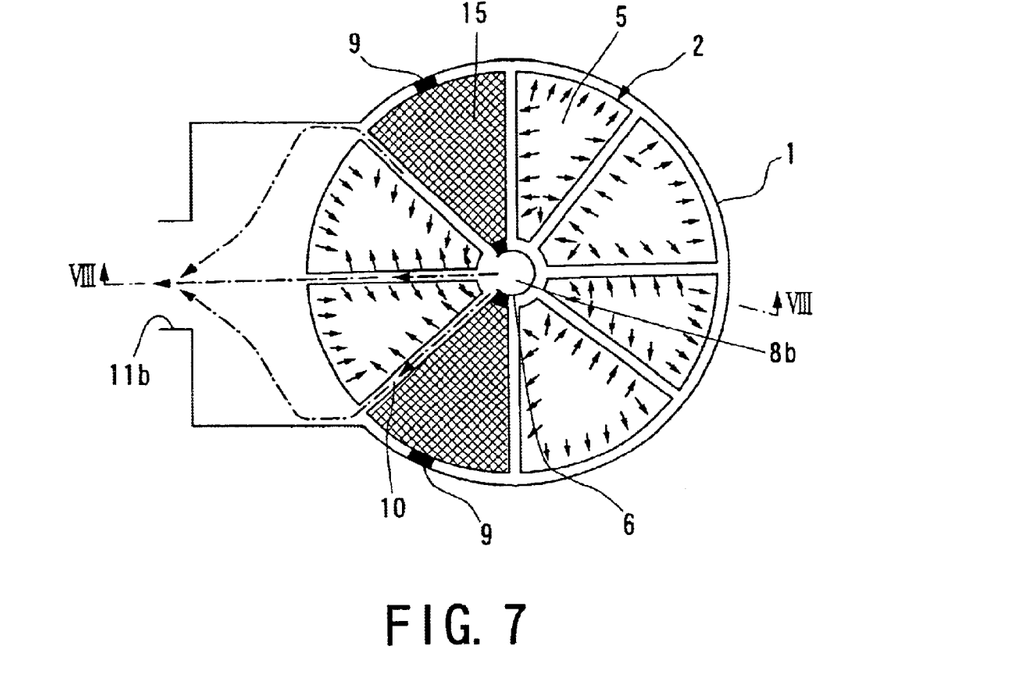
FIG. 7 is a schematic cross sectional view showing a second embodiment of a gas separator according to the present invention.
Figure 8:
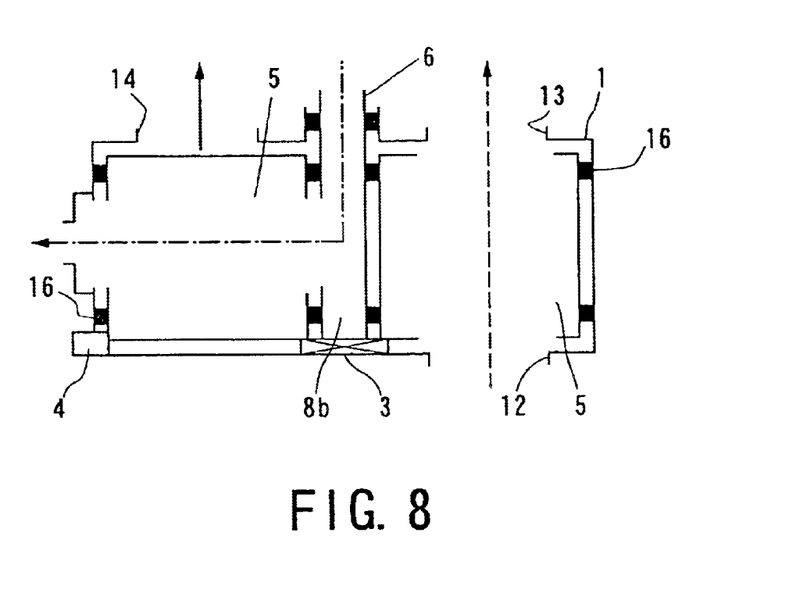
FIG. 8 is a schematic sectional view taken along the line VIII—VIII of FIG. 7.

FIG. 7 is a schematic lateral sectional view showing a second embodiment of the gas separator according to the present invention, and FIG. 8 is a schematic sectional view taken along the lines VIII—VIII of FIG. 7. The like reference numerals are attached to the same components as the first embodiment for description thereof.

According to this embodiment, a rotor 2 including flow paths in independent blocks 5 and supply paths 10 is provided and a carbon dioxide absorption/releasing material 5a for absorbing and releasing the carbon dioxide from mixed gas containing carbon dioxide according to the different temperature zones is provided in each of the blocks 5.

According to the second embodiment, the mixed gas set up to a temperature zone of about 500° C. necessary for absorption reaction of the carbon dioxide is supplied from the supply port 12 at a position in which the carbon dioxide in the rotor 2 is carried out (first rotation position). A central portion of the rotation of the rotor 2 is formed as a hollow static portion 6, which is not divided in the circumferential direction unlike the first embodiment and only an introduction path 8b is formed therein. Then, a temperature adjusting fluid (indicated by dot and dash line) of about 700° C. is introduced from this introduction path 8b.

As shown in FIGS. 7 and 8, a plurality of sealing or blocking portions 9 are provided between the static portion 6 and the rotor 2 and between the rotor 2 and the casing 1. As a result, the plural supply paths 10 formed among the plural blocks 5 are divided into two sections by these sealing portions 9 so that the supply path 10 located at a position of the recovery port 14 communicates with the introduction path 8b so as to form a second flow path.

Consequently, when the supply path 10 reaches a position of the recovery port 14, the temperature adjusting fluid of about 700° C. necessary for release reaction of carbon dioxide flows in.

An operation of this embodiment will be described hereunder.

By driving the driving unit 4, the rotor 2 is rotated in a single direction at a constant speed so as to feed the mixed gas adjusted to a temperature zone for absorbing the carbon dioxide into the block 5 from the supply port 12. Then, the temperature in the block 5 rises to about 500° C. so that the carbon dioxide absorption/releasing material 5a reacts with carbon dioxide to generate the lithium carbonate thereby absorbing the carbon dioxide. The mixed gas after this carbon dioxide has been absorbed is discharged via the discharge port 13.

Subsequently, when the rotor 2 is rotated so that the block 5 absorbing the carbon dioxide passes the blocking portion 15 and reaches the recovery port 14 of the casing 1, if the temperature adjusting fluid of about 700° C. flows into the supply path 10 from the introduction path 8b, the heat is transferred to the block 5, so that an atmosphere of about 700° C. is attained in the block 5 and lithium carbonate of the carbon dioxide absorption/releasing material 5a is decomposed thereby to release the absorbed carbon dioxide. Consequently, the concentration of carbon dioxide in the block 5 is increased and the mixed gas containing the high concentration carbon dioxide is recovered via the recovery port 14. Then, the temperature adjusting fluid coming out of the supply path 10 is discharged via the discharge port 11b.

According to this second embodiment, because the temperature of the mixed fluid containing the carbon dioxide is adjusted to a temperature zone in which the carbon dioxide absorption/releasing material 5a absorbs the carbon dioxide preliminarily, as compared to the first embodiment, the necessity of introducing the temperature adjusting fluid of about 500° C. is eliminated, and further, the separating plate 7 and discharge port 11a become unnecessary, so that the structure can be simplified considerably. Further, the size of the casing can be reduced. Because the other structure and operation thereof are substantially the same as those of the first embodiment, the description thereof is omitted.

Third Embodiment

Figure 9:
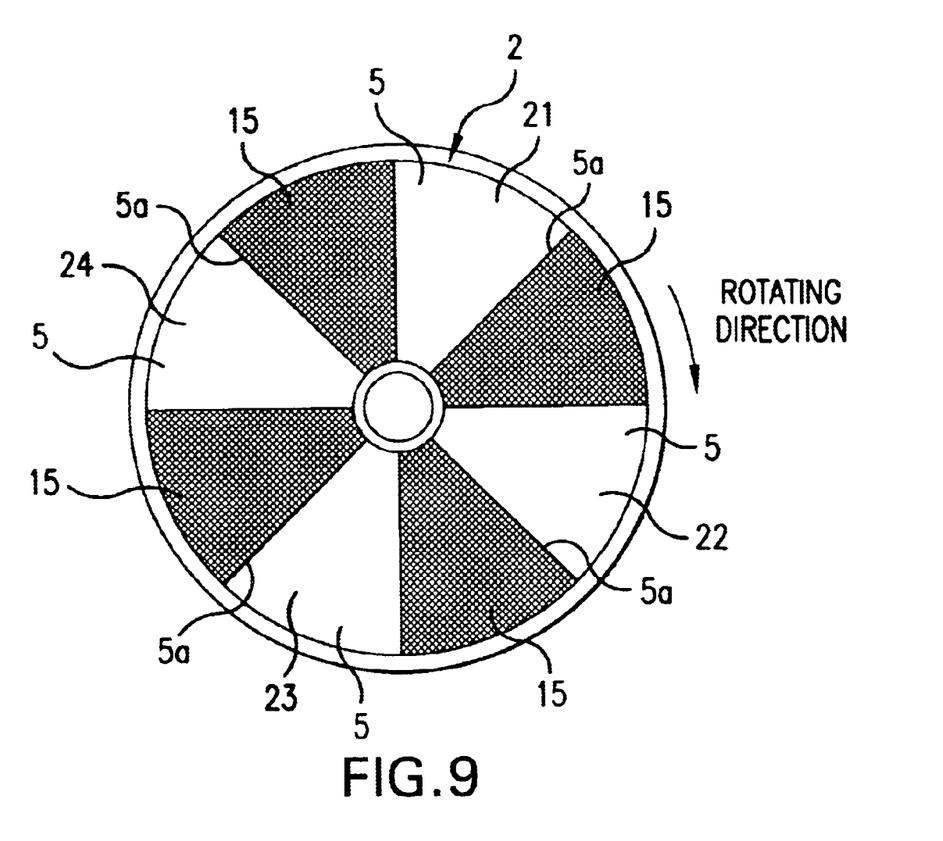
FIG. 9 is a schematic cross sectional view showing a third embodiment of the gas separator according to the present invention.

FIG. 9 is a schematic sectional view showing a third embodiment of a gas separator according to the present invention.

According to this third embodiment, like the first and second embodiments, the rotor 2 is fan shaped in its plan view and eight hollow blocks 5 are disposed in the circumferential direction. A carbon dioxide absorption/releasing material 5a for absorbing and releasing the carbon dioxide from the mixed gas containing the carbon dioxide depending on the different temperature zones is applied (bonded) to an inner surface of each of the blocks 5.

According to this embodiment, the flow path is formed only in the direction from rear to front relative to the surface of the drawing paper of FIG. 9 (axial direction) and the flow path is divided into the following four path sections in accordance with the functions thereof by the blocking portions 15 allocated in a casing (not shown) in a cross shape in plan view, that is: a temperature adjusting flow path 21 for feeding a fluid for adjusting the temperature of the carbon dioxide absorption/releasing material 5a to a temperature (about 500° C.) for absorbing the carbon dioxide; an absorption flow path 22 for absorbing the carbon dioxide from the mixed gas containing carbon dioxide; and a temperature adjusting flow path 23 for feeding a fluid for adjusting to a temperature (about 700° C.) for releasing the carbon dioxide; and a release flow path 24 for releasing the absorbed carbon dioxide to produce the mixed gas containing the high concentration carbon dioxide.

Therefore, if the rotor 2 is rotated so that a certain block 5 is located at the temperature adjusting flow path 21, the carbon dioxide absorption/releasing material 5a in that block 5 is adjusted to provide about 500° C. capable of absorbing the carbon dioxide. Next, if the block 5 adjusted in temperature passes the blocking portion 15 and reaches the absorption flow path 22, the carbon dioxide absorption/releasing material 5a absorbs the carbon dioxide from the mixed gas containing the carbon dioxide.

Further, if the block 5 of the carbon dioxide absorption/releasing material 5a which absorbs the carbon dioxide passes the blocking portion 15 and reaches the temperature adjusting flow path 23, the carbon dioxide absorption/releasing material 5a in that block 5 is adjusted to about 700° C. for releasing the carbon dioxide. Next, if the block 5 adjusted in temperature passes the blocking portion 15 and reaches the release flow path 24, the carbon dioxide absorption/releasing material 5a which absorbs the carbon dioxide releases carbon dioxide.

According to this third embodiment, because the flow paths are formed only in the direction from rear to front relative to the drawing paper surface of FIG. 9 (axial direction) as compared with the first and second embodiments in which the independent first and second flow paths are provided in the rotor 2, the structure thereof can be further simplified.

The present invention is not limited to the above described respective embodiments and may be modified in various ways. Although in the above respective embodiments, a rotor 2 is provided in the casing 1, if the rotors 2 are provided on multiple stage in the axial direction, the separating performance can be intensified to a large extent.

Although in the above respective embodiments, carbon dioxide is separated as the specific gas from emission gas containing the carbon dioxide as a mixed gas, if the gas absorption/releasing material is changed without conforming to these examples, the present invention can be applied to a unit for separating the other gas.

What is claimed is:

1. A gas separator for separating a specific gas from a mixed gas, comprising:
    an outer casing;
    a rotating body disposed inside the casing, the rotating body comprising a plurality of circumferentially arranged fan-shaped hollow blocks, each of the blocks having an interior portion with an inner wall surface;
    a gas absorption/releasing material for absorbing and releasing a specific gas from a mixed gas depending on temperature, disposed on the inner wall surface of each block;
    first and second independent gas flow path structures, wherein:
        the first gas flow path structure extends linearly from a gas supply port at a first end of the outer casing to an exhaust port at a second end of the outer casing and which passes through an interior portion of at least one of the hollow blocks when it is between the gas supply port and the exhaust port, and
        the second gas flow path structure comprises:
            an introduction path formed at a substantially central portion of the rotating body, and
            first and second supply paths which are isolated from communication with the interior portions of the respective blocks and which extend between the respective blocks in directions perpendicular to a central axis of the rotating body, the first and second supply paths respectively interconnecting the introduction path with first and second discharge ports by way of first and second spaces located between the outer casing and portions of the outer peripheral portion of the rotating body;
    wherein:
        the introduction path and the first and second supply paths are divided into first and second sections and a first temperature control gas and a second temperature control gas flow respectively through the first and second sections to the first and second discharge ports to establish first and second temperature zones within the outer casing,
    wherein:
        the discharge ports are disposed at opposed locations on the outer casing such that, with respect to the central axis of the rotating body, the sides of the casing on which the first and second discharge ports are respectively disposed constitute first and second areas wherein the respective blocks of the rotating body are exposed to the first temperature zone when passing the first area for release of the specific gas absorbed by the gas absorption/releasing material therein, while, the blocks of the rotating body are exposed to the second temperature zone, when passing the second area, whereby gas passing through the first gas flow path passes through an interior of each block and the specific gas in the mixed gas is absorbed by the absorption/releasing material, wherein the rotating body has:
    a hollow static portion which extends along an axis about which the rotating body is rotatable, the hollow static portion being divided into two sections to divide the introduction path into first and second portions for the first temperature gas and the second temperature gas respectively, and     sealing portions which are disposed between the static portion and the rotating body and between the rotating body and the casing so as to seal and separate the first and second portions of the introduction supply path through which the first and second temperature adjusting fluids respectively flow, wherein:
    the rotating body rotates through a plurality of rotational positions, wherein:
    the mixed gas is fed to the gas absorption/releasing material at a first rotating position of the rotating body which is located in the first temperature zone, the specific gas is released from the gas absorption/releasing material at a second rotational position of the rotating body which is located in the second temperature zone, and wherein:

blocking positions which are located in the casing between the first rotational position and the second rotational position, block communication between the first and second rotational position.

2. A gas separator according to claim 1, wherein at least one of a honey-comb member and a fin member is provided in the interior portion of each of the blocks.

3. A gas separator according to claim 1, wherein the specific gas is carbon dioxide and the gas absorption/releasing material is a lithium based material which reacts with the carbon dioxide to generate lithium carbonate thereby to absorb carbon dioxide and which releases the carbon dioxide by decomposition of the carbonate.

4. A gas separator according to claim 3, wherein the second temperature zone is heated by the second temperature control gas having a temperature of approximately 500° C. while the first temperature zone is heated by the first temperature control gas having a temperature of over approximately 700° C.

5. A gas separator according to claim 3, wherein the first temperature zone is configured to be heated to a temperature of over approximately 700° C. by the first temperature control gas while the second temperature zone is configured to be heated to a temperature of approximately 500° C. by the second temperature control gas.

6. A gas separating comprising:
    a circular rotating body formed of a plurality of fan shaped blocks, each of the blocks having opposed open flat faces in which openings are respectively formed which permit gas to flow through a hollow interior of the block, each block having non-perforate curved inner and outer edges and non-perforate radially extending flat sides which are angled with respect to one another, the non-perforate flat sides cooperating to define temperature adjustment passages through which temperature adjusting fluids flow and exclusively contact external surfaces of the block and change the temperature of the blocks;

an essentially cylindrical casing in which the rotating body is disposed, the casing having first and second axial ends in which a gas inlet port and a gas outlet port are respectively formed so that gas flows axially through a segment of the housing and through the fan shaped blocks which rotate into the segment; and     a stationary tubular member which is disposed coaxially along an axis about which the circular rotating body is rotatable, the tubular member being divided into two halves which respectively define first and second separate elongate passages that respectively carry flows of first and second temperature control fluids and which respectively deliver the first and second temperature control fluids respectively to first and second temperature adjustment fluid discharge ports which are formed in a curved side of the cylindrical housing and on essentially opposite sides of the cylindrical housing via selected temperature adjustment passages, thus establishing two segment-shaped temperature zones within the cylindrical casing on opposite sides of the stationary tubular member.

\* \* \* \* \*